(12) United States Patent
Murai et al.

(10) Patent No.: US 6,336,373 B1
(45) Date of Patent: Jan. 8, 2002

(54) ROTARY ELECTROMAGNETIC ACTUATOR

(75) Inventors: Masakazu Murai, Oogawara-machi; Shigeto Ryuen, Sendai, both of (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/537,672

(22) Filed: Mar. 29, 2000

(30) Foreign Application Priority Data

Mar. 30, 1999 (JP) ........................................... 11-087579

(51) Int. Cl.[7] ......................... F16H 59/02; F16H 61/18; B60K 41/26
(52) U.S. Cl. ...................... 74/473.23; 74/98; 74/473.21; 74/483 R; 74/526; 192/220.4; 310/36; 335/272; 403/357
(58) Field of Search .................... 74/98, 473.21, 74/473.23, 483 R, 526; 192/220.4; 310/36, 37; 335/272; 403/357

(56) References Cited

U.S. PATENT DOCUMENTS

| 488,322 A | * | 12/1892 | Mills ........................... 49/334 |
| 4,346,319 A | * | 8/1982 | Naganuma ............... 335/272 X |
| 4,496,134 A | * | 1/1985 | Idogaki et al. ........... 335/272 X |
| 4,838,226 A | * | 6/1989 | Matsuzawa et al. ......... 123/399 |
| 5,083,514 A | * | 1/1992 | Schwartz et al. ............ 108/147 |
| 5,695,029 A | * | 12/1997 | Yokoyama et al. ........ 192/219.6 |
| 6,009,769 A | * | 1/2000 | Ikegami ................... 74/473.23 |

* cited by examiner

Primary Examiner—Allan D. Herrmann
(74) Attorney, Agent, or Firm—Arent, Fox, Kintner, Plotkin & Kahn, PLLC

(57) ABSTRACT

A drivig rotary shaft and a follower rotary shaft are rotatably carried in a housing of a rotary solenoid. Operating members fixed to the rotary shafts by clips are operatively connected to each other by gears, and a locked member is locked non-movably by locking surfaces formed at tip ends of the operating members. This makes it unnecessary to provide a device for converting a rectilinear motion to a rotational motion such as a pin and an elongated bore in a path of transmission of a driving force from the rotary solenoid to the operating members. Therefore, not only the number of parts and the number of assembling steps are reduced, but also the number of slide areas, where a friction resistance and looseness are liable to be produced, is reduced, thereby enabling a noiseless smooth operation.

9 Claims, 11 Drawing Sheets

ROTARY ELECTROMAGNETIC ACTUATOR

BACKGROUND OF THE INVENTION

1. Field of the Invention

The present invention relates to a rotary electromagnetic actuator for rotating a first operating member and a second operating member in association with each other through an electromagnetic driving source.

2. Description of Related Art

FIGS. 11A and 11B show a prior art electromagnetic actuator A used in a shift lock device for limiting the movement of a select lever for an automatic transmission of an automobile.

The electromagnetic actuator A includes an on-off solenoid 2 for driving a plunger 1 in advancing and retracting movements by an electromagnetic force, a first link 4 rotatably supported on a first stationary shaft 3 fixed to a housing, and a second link 6 rotatably supported on a second stationary shaft 5 fixed to the housing. A pin $4_1$ provided on the first link 4 is engaged in an elongated bore $1_1$ defined at a tip end of the plunger 1, and a pin $6_1$ provided on the second link 6 is engaged in an elongated bore $4_2$ defined in the first link 4.

Therefore, when the on-off solenoid 2 is in its non-excited state in which the plunger 1 has been advanced, as shown in FIG. 11A, the first link 4 having the pin $4_1$ pushed in the elongated bore $1_1$ in the plunger 1 is rotated clockwise about the first stationary shaft 3, and in association with this rotation, the second link 6 having the pin $6_1$ pushed in the elongated bore $4_2$ in the first link 4 is rotated counterclockwise about the second stationary shaft 5. As a result, locking surfaces 7 and 8 provided at tip ends of the first and second links 4 and 6 are moved toward each other, whereby the locking surface 7 of the first link 4 blocks a path of movement of a locked member 9 of a select lever from a neutral range, or the locking surface 8 of the second link 6 blocks a path of movement of the locked member 9 of the select lever from a parking range, thereby inhibiting the operation of the select lever.

When the on-off solenoid 2 is brought into its excited state to retract the plunger 1, as shown in FIG. 11B, the first link 4 having the pin $4_1$ pulled in the elongated bore $1_1$ in the plunger 1 is rotated counterclockwise about the first stationary shaft 3, and in association with this rotation, the second link 6 having the pin $6_1$ pulled in the elongated bore $4_2$ in the first link 4 is rotated clockwise about the second stationary shaft 5. As a result, the locking surfaces 7 and 8 provided at tip ends of the first and second links 4 and 6, respectively, are moved away from each other, whereby the locking surface 7 of the first link 4 and the locking surface 8 of the second link 6 are retracted from the path of movement of the locked member 9 of the select lever, thereby permitting the operation of the select lever.

The above-described prior art electromagnetic actuator A suffers from the following problem: The plunger 1 and the first link 4 are engaged with each other by the elongated bore $1_1$ and the pin $4_1$, and the first link 4 and the second link 6 are engaged with each other by the elongated bore $4_2$ and the pin $6_1$. For this reason, not only the number of parts and the number of assembling steps are increased, but also looseness is produced in the engaged portions, whereby a smooth operation is obstructed.

Moreover, the prior art electromagnetic actuator A suffers from another problem. That is, it has slide areas at four points (1), (2), (3) and (4) which will be described below, and for this reason, the sliding resistance is increased and the burden of the on-off solenoid 2 is increased:

(1) a slide area between the elongated bore $1_1$ of the plunger 1 and the pin $4_1$ of the first link 4;

(2) a slide area between the first stationary shaft 3 and the first link 4;

(3) a slide area between the elongated bore $4_2$ in the first link 4 and the pin $6_1$ of the second link 6; and (4) a slide area between the second stationary shaft 5 and the second link 6.

To reduce the sliding resistance, it is necessary to apply a lubricant such as silicone grease to each of the slide areas. However, this is accompanied by the following problem: The viscosity of the lubricant increases with the dropping of the temperature. For this reason, if the size of the on-off solenoid 2 is increased in order to overcome the sliding resistance even at a very low temperature to ensure a smooth operation, the driving force of the on-off solenoid becomes excessive at ambient temperature at which the viscosity of the lubricant decreases to make the sliding resistance decreased. This causes the plunger 1 to strike strong a stopper at the end of its stroke, thereby making a noise. Especially, the on-off solenoid 2 has such a characteristic that the driving force is changed largely relative to the stroke of the plunger 1. For this reason, when the driving force of the on-off solenoid 2 is increased in the vicinity of the end of the stroke, there is a possibility that the noise may grow further larger.

SUMMARY OF THE INVENTION

Accordingly, it is an object of the present invention to provide a rotary electromagnetic actuator for rotating a first operating member and a second operating member in association with each other through an electromagnetic driving source, wherein the structure of the rotary electromagnetic actuator is simplified, leading to reductions in number of parts and number of assembling steps.

It is another object of the present invention to provide a rotary electromagnetic actuator for rotating a first operating member and a second operating member in association with each other through an electromagnetic driving source, wherein the application of a lubricant is not required, and the noise is reduced.

It is a further object of the present invention to provide a rotary electromagnetic actuator for rotating a first operating member and a second operating member in association with each other through an electromagnetic driving source, wherein the driving force is prevented from being changed largely even in the vicinity of the end of the stroke to reduce the noise.

To achieve the above object, according to a first aspect and feature of the present invention, there is provided a rotary electromagnetic actuator comprising an electromagnetic driving source including a driving rotary shaft rotatably carried in a housing and driven in rotation by an electromagnetic force, a follower rotary shaft rotatably carried in the housing, a first operating member carried on and rotated in unison with the driving rotary shaft, a second operating member carried on and rotated in unison with the follower rotary shaft, and an operatively connecting means for permitting the first operating member and the second operating member to be rotated in association with each other.

With the above arrangement, when the electromagnetic driving source is driven to rotate the driving rotary shaft, the first operating member is rotated in unison with the driving rotary shaft. This rotation of the first operating member is transmitted through the operatively connecting means to the second operating member to rotate the second operating member in unison with the follower rotary shaft. Therefore, the first and second operating members can be rotated in unison with each other. In addition, it is unnecessary to provide a pin and an elongated bore, or means for converting a rectilinear motion to a rotational motion such as a stationary shaft and a link in a path of transmitting the driving force from the electromagnetic driving source to the first and second operating members. Therefore, not only the number of parts and the number of assembling steps are reduced, but also the number of slide areas where a friction resistance or looseness is liable to be produced, is reduced, thereby enabling a noiseless smooth operation. Especially, the first and second operating members are carried on the rotary shafts rather than on stationary shafts as in the prior art and hence, a sliding resistance cannot be produced between the first operating member and the driving rotary shaft or between the second operating member and the follower rotary shaft, because they are rotated in unison with each other. In addition, the driving rotary shaft itself which is an output shaft of the electromagnetic drive source also serves to support the first operating member and hence, the number of parts and the number of assembling steps are further reduced. Moreover, the driving rotary shaft, the follower rotary shaft, the first and second operating members and the operatively connecting means can be assembled to the housing of the electromagnetic driving source to form an assembly and hence, the assemblability and the handling of the rotary electromagnetic actuator are enhanced remarkably.

To achieve the above object, according to a second aspect and feature of the present invention, there is provided a rotary electromagnetic actuator comprising an electromagnetic driving source including a driving rotary shaft rotatably carried in a housing and driven in rotation by an electromagnetic force, a follower rotary shaft rotatably carried in the housing, a first operating member carried on and rotated in unison with the driving rotary shaft, a second operating member carried on and rotated in unison with the follower rotary shaft, and an operatively connecting means for permitting the first operating member and the second operating member to be rotated in association with each other without through a slide area, wherein no lubricant is applied between the driving rotary shaft and the first operating member, between the follower rotary shaft and the second operating member, or to the operatively connecting means.

With the above arrangement, when the electromagnetic driving source is driven to rotate the driving rotary shaft, the first operating member is rotated in unison with the driving rotary shaft. This rotation of the first operating member is transmitted through the operatively connecting means to the second operating member to rotate the second operating member in unison with the follower rotary shaft. Therefore, the first and second operating members can be rotated in unison with each other. In addition, it is unnecessary to provide a pin and an elongated bore, or means for converting a rectilinear motion to a rotational motion such as a stationary shaft and a link in a path of transmitting the driving force from the electromagnetic driving source to the first and second operating members. Therefore, not only the number of parts and the number of assembling steps are reduced, but also the number of slide areas where a friction resistance or looseness is liable to be produced, is reduced, thereby enabling a noiseless smooth operation. Especially, the first and second operating members are carried on the rotary shafts rather than on stationary shafts as in the prior art and hence, a sliding resistance cannot be produced between the first operating member and the driving rotary shaft and between the second operating member and the follower rotary shaft, because they are rotated in unison with each other. In addition, the driving rotary shaft itself which is an output shaft of the electromagnetic driving source also serves to support the first operating member and hence, the number of parts and the number of assembling steps are further reduced. Moreover, the driving rotary shaft, the follower rotary shaft, the first and second operating members and the operatively connecting means can be assembled to the housing of the electromagnetic driving source to form an assembly and hence, the assemblability and the handling of the rotary electromagnetic actuator are enhanced remarkably. Especially, there is no slide area between the driving rotary shaft and the first operating member and between the follower rotary shaft and the second operating member as well as in the operatively connecting means, and hence, it is unnecessary to apply a lubricant such as silicone grease, and an increase or decrease in sliding resistance due to a variation in viscosity of the lubricant is not produced. As a result, it is unnecessary to provide an electromagnetic driving source having a large capacity required to overcome a large sliding resistance. This can contribute to a reduction in size of the rotary electromagnetic actuator and also eliminate a disadvantage that when the sliding resistance is small, the driving force of the electromagnetic driving source becomes excessive, resulting in the generation of a noise at the end of a stroke.

To achieve the above object, according to a third aspect and feature of the present invention, there is provided a rotary electromagnetic actuator comprising a rotary solenoid including a driving rotary shaft rotatably carried in a housing and driven in rotation by an electromagnetic force, a follower rotary shaft rotatably carried in the housing, a first operating member carried on and rotated in unison with the driving rotary shaft, a second operating member carried on and rotated in unison with the follower rotary shaft, and an operatively connecting means for permitting the first operating member and the second operating member to be rotated in association with each other.

With the above arrangement, when the rotary solenoid is driven to rotate the driving rotary shaft, the first operating member is rotated in unison with the driving rotary shaft. This rotation of the first operating member is transmitted through the operatively connecting means to the second operating member to rotate the second operating member in unison with the follower rotary shaft. Therefore, the first and second operating members can be rotated in unison with each other. In addition, it is unnecessary to provide a pin and an elongated bore, or means for converting a rectilinear motion to a rotational motion such as a stationary shaft and a link in a path of transmitting the driving force from the electromagnetic driving source to the first and second operating members. Therefore, not only the number of parts and the number of assembling steps are reduced, but also the number of slide areas where a friction resistance or looseness is liable to be produced, is reduced, thereby enabling a noiseless smooth operation. Especially, the first and second operating members are carried on the rotary shafts rather than on stationary shafts as in the prior art and hence, a sliding resistance cannot be produced between the first operating member and the driving rotary shaft or between the second operating member and the follower rotary shaft, because they are rotated in unison with each other. In addition, the driving rotary shaft itself which is an output shaft of the electromagnetic driving source also serves to support the first operating member and hence, the number of parts and the number of assembling steps are further reduced. Moreover, the driving rotary shaft, the follower rotary shaft, the first and second operating members and the operatively connecting means can be assembled to the housing of the rotary solenoid to form an assembly and hence, the assemblability and the handling of the actuator are enhanced remarkably. Especially, the use of the rotary solenoid as an electromagnetic driving source ensures that the variation in driving force with respect to the angle of rotation of the driving rotary shaft is decreased, thereby eliminating such a disadvantage that the driving force of the rotary solenoid becomes excessive, causing the generation of a noise at the end of a stroke.

To achieve the above object, according to a fourth aspect and feature of the present invention, there is provided a rotary electromagnetic actuator comprising an electromagnetic driving source including a driving rotary shaft rotatably carried in a housing and driven in rotation by an electromagnetic force, a follower rotary shaft rotatably carried in the housing, a first operating member carried on and rotated in unison with the driving rotary shaft, a second operating member carried on and rotated in unison with the follower rotary shaft, and an operatively connecting means for permitting the first operating member and the second operating member to be rotated in association with each other, the first and second operating member being provided at their free ends respectively with locking surfaces capable of inhibiting the movement of a select lever for an automatic transmission, the locking surfaces of the first and second operating members being arranged, so that they face a path of movement of the select lever in a non-excited state of the electromagnetic driving source to inhibit the movement of the select lever from a parking range and a neutral range, and they are retracted from the path of movement of the select lever upon excitation of the electromagnetic drive source to permit the movement of the select lever from the parking range and the neutral range.

With the above arrangement, when the electromagnetic driving source is driven to rotate the driving rotary shaft, the first operating member is rotated in unison with the driving rotary shaft. This rotation of the first operating member is transmitted through the operatively connecting means to the second operating member to rotate the second operating member in unison with the follower rotary shaft. Therefore, the first and second operating members can be rotated in unison with each other. In addition, it is unnecessary to provide a pin and an elongated bore, or means for converting a rectilinear motion to a rotational motion such as a stationary shaft and a link in a path of transmitting the driving force from the electromagnetic driving source to the first and second operating members. Therefore, not only the number of parts and the number of assembling steps are reduced, but also the number of slide areas where a friction resistance or looseness is liable to be produced, is reduced, thereby enabling a noiseless smooth operation. Especially, the first and second operating members are carried on the rotary shafts rather than on stationary shafts as in the prior art and hence, a sliding resistance cannot be produced between the first operating member and the driving rotary shaft or between the second operating member and the follower rotary shaft, because they are rotated in unison with each other. In addition, the driving rotary shaft itself which is an output shaft of the electromagnetic driving source also serves to support the first operating member and hence, the number of parts and the number of assembling steps are further reduced. Moreover, the driving rotary shaft, the follower rotary shaft, the first and second operating members and the operatively connecting means can be assembled to the housing of the electromagnetic driving source to form an assembly and hence, the assemblability and the handling of the rotary electromagnetic actuator are enhanced remarkably. Especially, since the locking surfaces capable of inhibiting the movement of the select lever for the automatic transmission from the parking range or the neutral range are provided at the free ends of the first and second operating members, respectively, the select lever can be previously prevented from being inadvertently operated from the parking range and the neutral range.

The above and other objects, features and advantages of the invention will become apparent from the following description of the preferred embodiment taken in conjunction with the accompanying drawings.

BRIEF DESCRIPTION OF THE DRAWINGS

FIGS. 1 to 10B show an embodiment of the present invention, wherein

FIG. 1 is a perspective view of a select lever device for an automobile;

FIG. 2 is an exploded perspective view of the select lever device;

FIG. 3 is a view taken in the direction of an arrow 3 in FIG. 1;

FIG. 4 is a sectional view taken along a line 4—4 in FIG. 3;

FIG. 5 is a view taken along a line 5—5 in FIG. 3;

FIG. 6 is a sectional view taken along a line 6—6 in FIG. 5;

FIG. 7 is a view taken along a line 7—7 in FIG. 6;

FIG. 8 is a view for explaining the operation on the excitation of a rotary solenoid;

FIG. 9 is a perspective view of an operating member and a clip;

FIGS. 10A and 10B are views for explaining the operation of a rotary electromagnetic actuator.

DESCRIPTION OF THE PREFERRED EMBODIMENT

Figure 1:
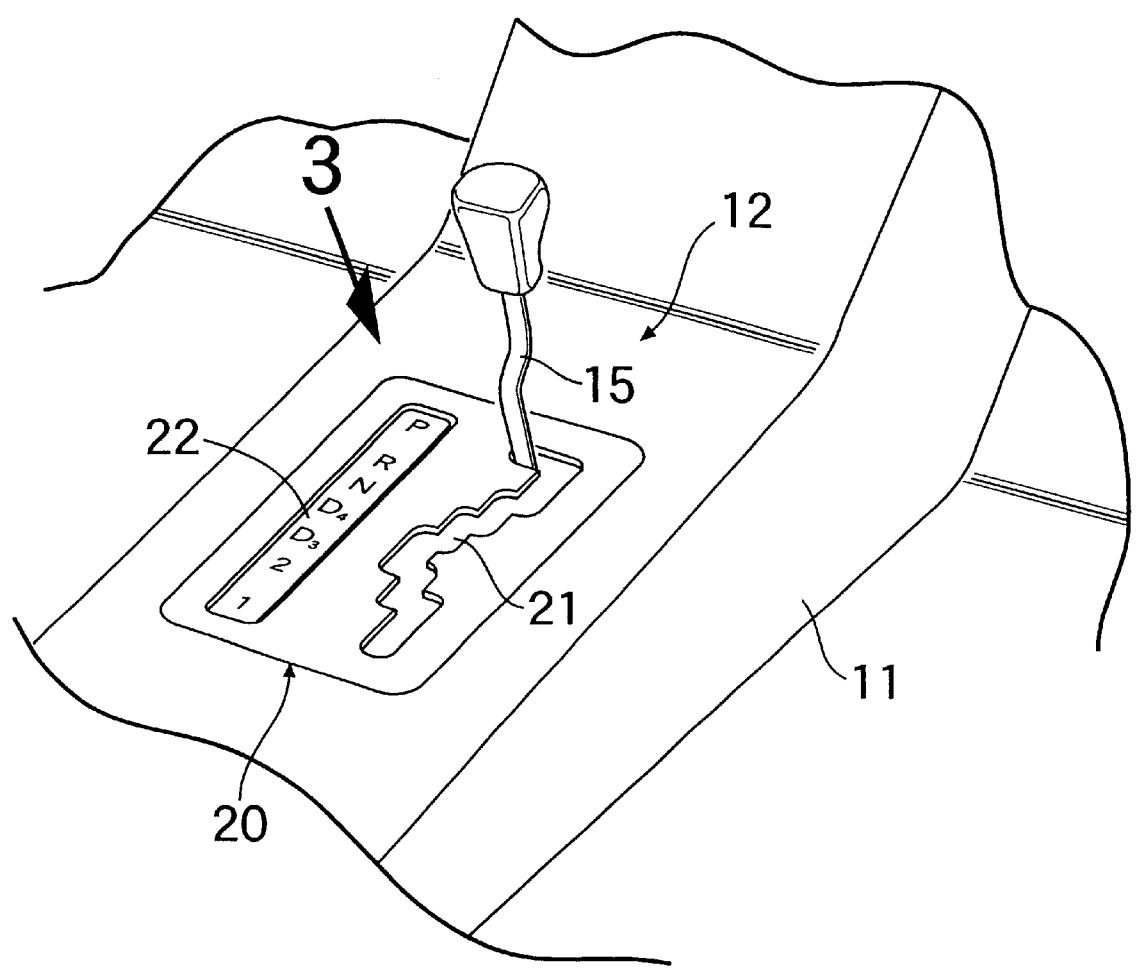
Figure 2:
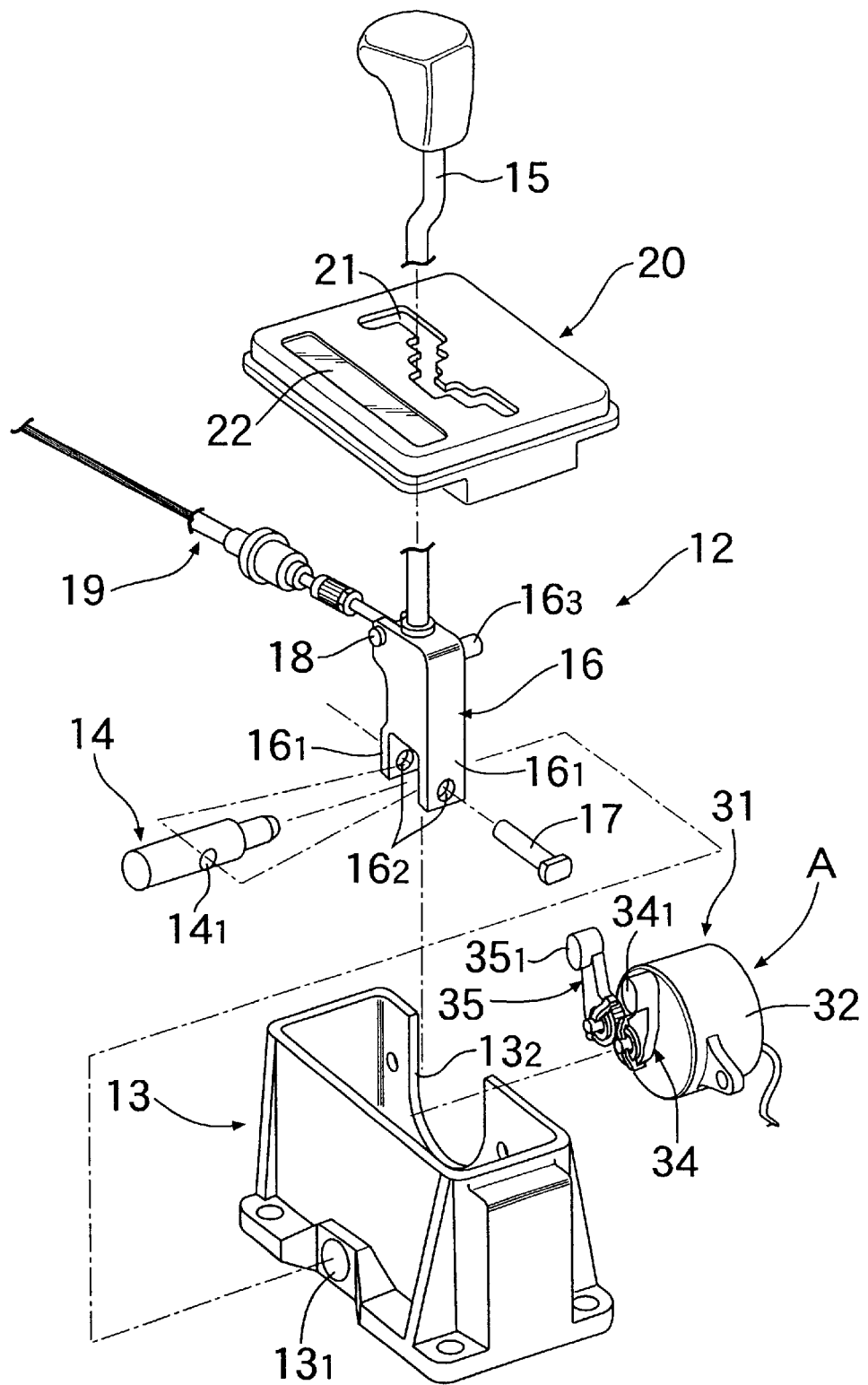
Figure 3:
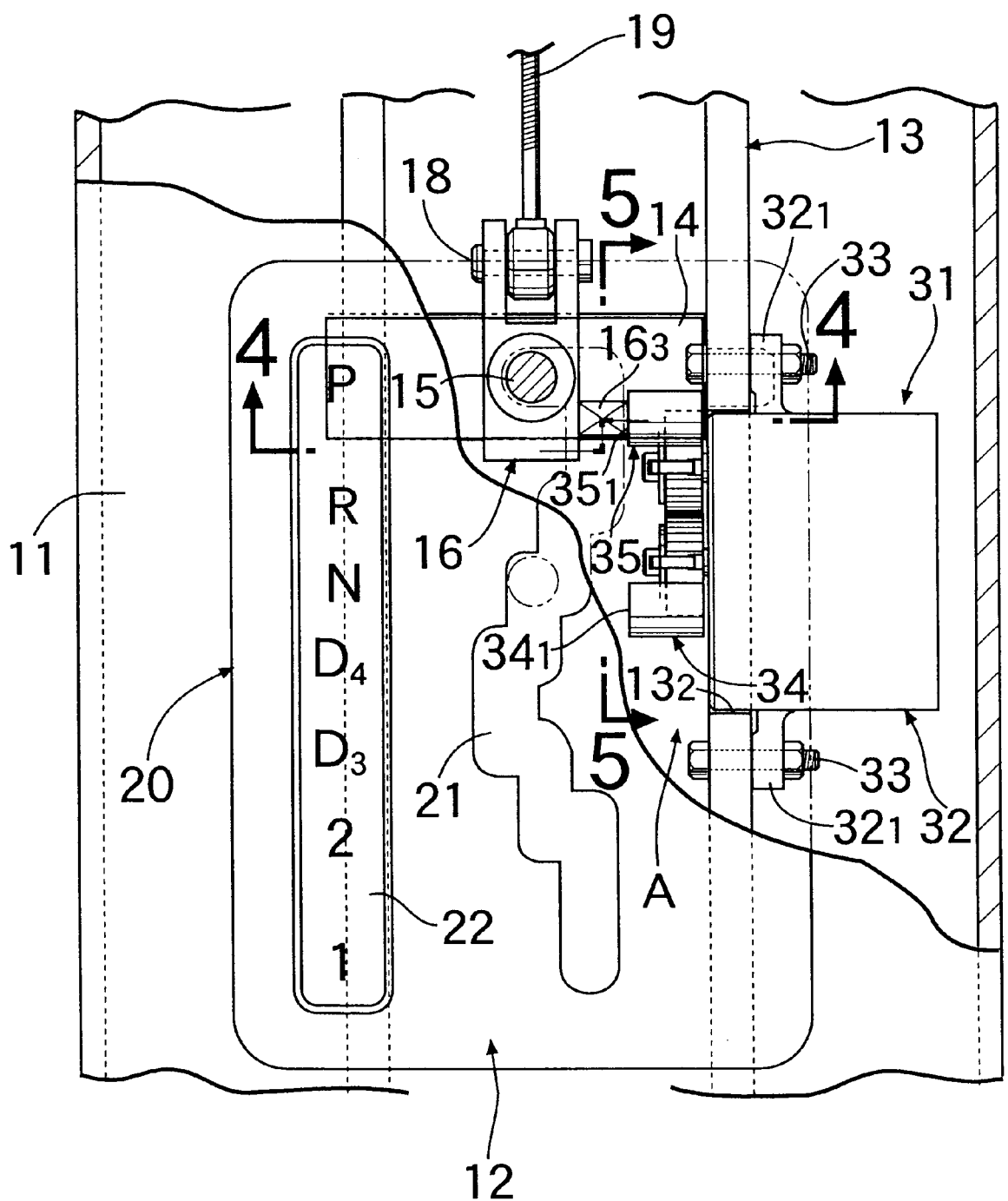
Figure 4:
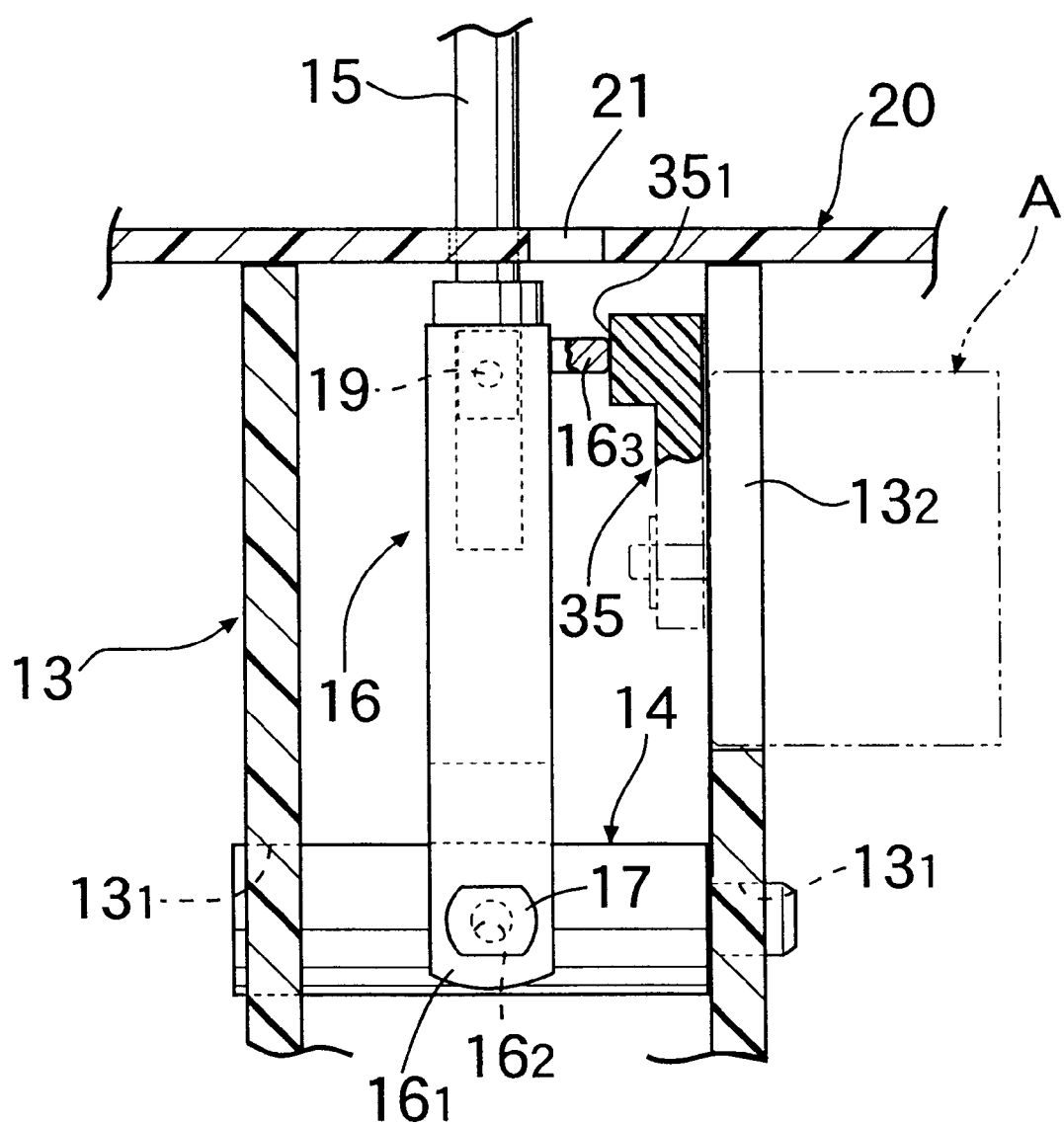
Figure 5:
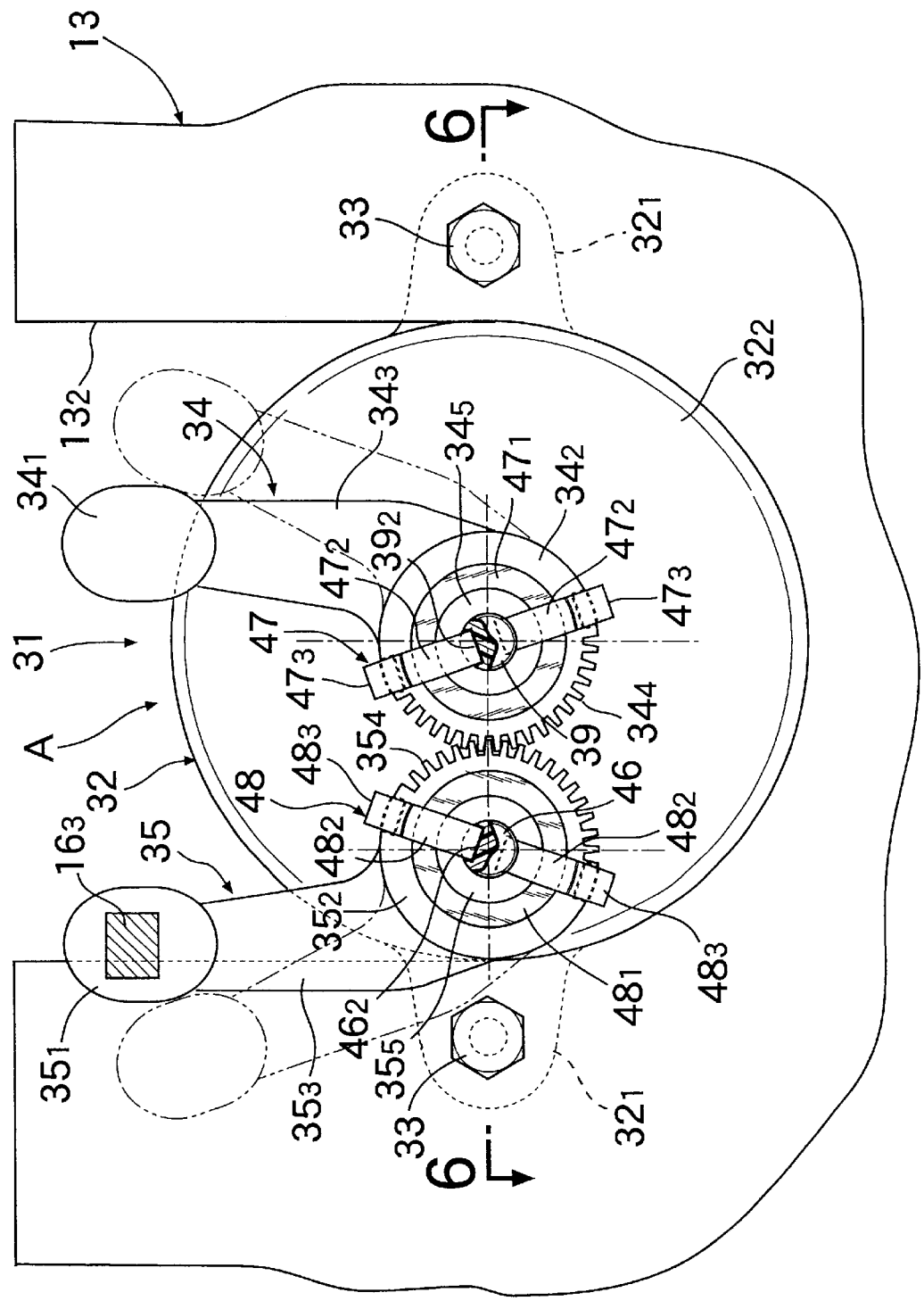
Figure 6:
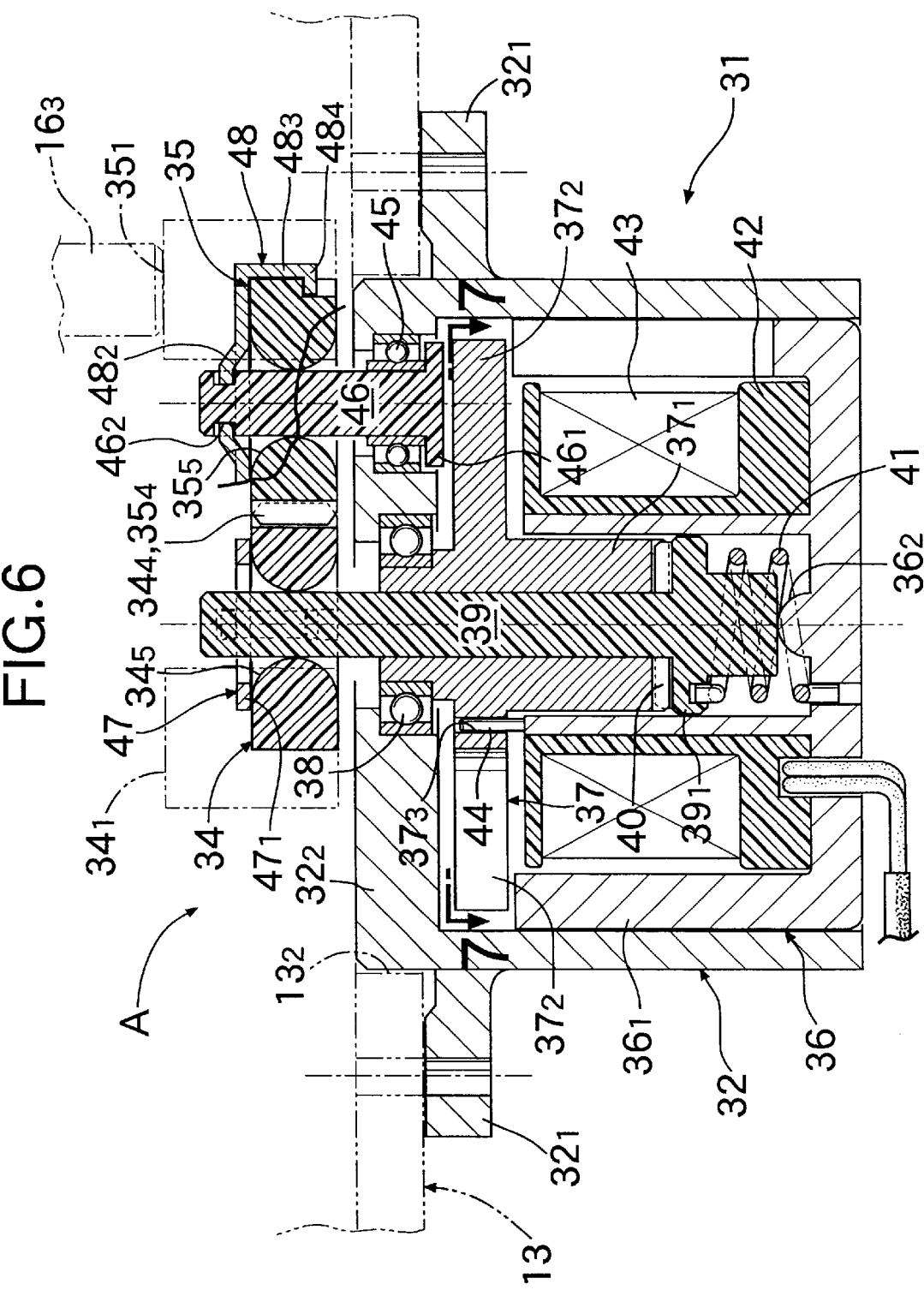

The present invention will now be described by way of an embodiment shown in the accompanying drawings.

As shown In FIGS. 1 to 4, a select lever device 12 for an automatic transmission is mounted on a floor console 11 disposed in a vehicle compartment of an automobile. The select lever device 12 includes a support frame 13 accommodated within the floor console 11, and a first support shaft 14 extending in a lateral direction of a vehicle body is longitudinally turnably supported in shaft bores $13_1$, $13_1$ defined in the support frame 13. A pair of flanges $16_1$, $16_1$ are projectingly provided at a lower end of a lever base 16 of a select lever 15, and shaft bores $16_2$, $16_2$ defined in the flanges $16_1$, $16_1$ and a shaft bore $14_1$ passing through a central portion of the first support shaft 14 are connected to each other by a second support shaft 17 extending in a longitudinal direction of the vehicle body. Therefore, the select lever 15 and the lever base 16 are rotatable in the longitudinal direction of the vehicle body about the first support shaft 14 relative to the support frame 13 and rotatable in the lateral direction of the vehicle body about the second support shaft 17 relative to the first support shaft 14. A Bowden cable 19 is connected at one end thereof to a front surface of an upper end of the lever base 16 through a pin 18 and at the other end thereof to an automatic transmission mounted in an engine room.

A select indicator panel 20 mounted on an upper surface of the floor console 11 includes a stepped guide groove 21 and an indicator 22, and an upper portion of the select lever 15 extends through the guide groove 21 into the vehicle compartment. The select lever 15 is capable of selecting any of a parking range ("P" range), a reverse range ("R" range), a neutral range ("N" range), a fourth-speed automatic shifting range ("$D_4$" range), a third-speed automatic shifting range ("$D_3$" range), a second-speed fixing range ("2" range), and a first-speed fixing range ("1" range). The selected range is indicated on the indicator.

To conduct an operation of selection from the "P" range to the "R" range, the select lever 15 is once operated in a rightward direction along the guide groove 21 and then operated rearwards. To conduct an operation of selection from the "N" range to the "R" range, the select lever 15 is once operated in the rightward direction along the guide groove 21 and then operated forwards. In order to enable the operation of selection from the "P" range to the "R" range and the operation of selection from the "N" range to the "R" range only in a state in which a driver has depressed a brake pedal, a locking mechanism using a rotary electromagnetic actuator A is mounted.

More specifically, the rotary electromagnetic actuator A includes a rotary solenoid 31 as an electromagnetic driving source 31, and is fixed to a right wall of the support frame 13 by bolts 33, 33 passing through a pair of flanges $32_1$, $32_1$ projectingly provided on a cylindrical housing 32 of the rotary solenoid 31 in a state in which the cylindrical housing 32 has been fitted into a U-shaped notch $13_2$ defined in the right wall of the support frame 13. The rotary electromagnetic actuator A includes a first operating member 34 and a second operating member 35 which are opened and closed by the rotary solenoid 31. Thus, by allowing locking surfaces $34_1$ ad $35_1$ provided respectively at tip ends of the first and second operating members 34 and 35 to face a locked member $16_3$ projecting provided on a right side of the lever base 16, the select lever 15 is restricted from being moved rightwards from the "R" range or the "N" range, and is locked in the "R" range or "N" range.

The structure of the rotary electromagnetic actuator A will now be described below with reference to FIGS. 5 to 9.

The rotary solenoid 31 as one example of the rotary electromagnetic actuator A includes the cylindrical housing 32, and a core 36 fixed to close an open surface of the housing 32 has four protrusions $36_1$ extending in an axial direction along an inner surface of the housing 32 at 90° intervals. A rotor 37 includes a shaft portion $37_1$ supported on an end wall $32_2$ of the housing 32 with a ball bearing 38 interposed therebetween, and four arm portions $37_2$ which extend at 90° intervals from tip ends of the four protrusions $36_1$ of the core and which can be opposed to tip ends of the four protrusions $36_1$ of the core 36. A driving rotary shaft 39 passing through the center of the shaft portion $37_1$ of the rotor 37 has a flange $39_1$ integrally coupled to the shaft portion $37_1$ by a concave-convex engage portion 40. Therefore, the driving rotary shaft 39 is supported indirectly to the housing 32 by the ball bearings 38 with the shaft portion $37_1$ of the rotor 37 interposed therebetween, and is capable of being rotated in unison with the rotor 37.

Figure 7:
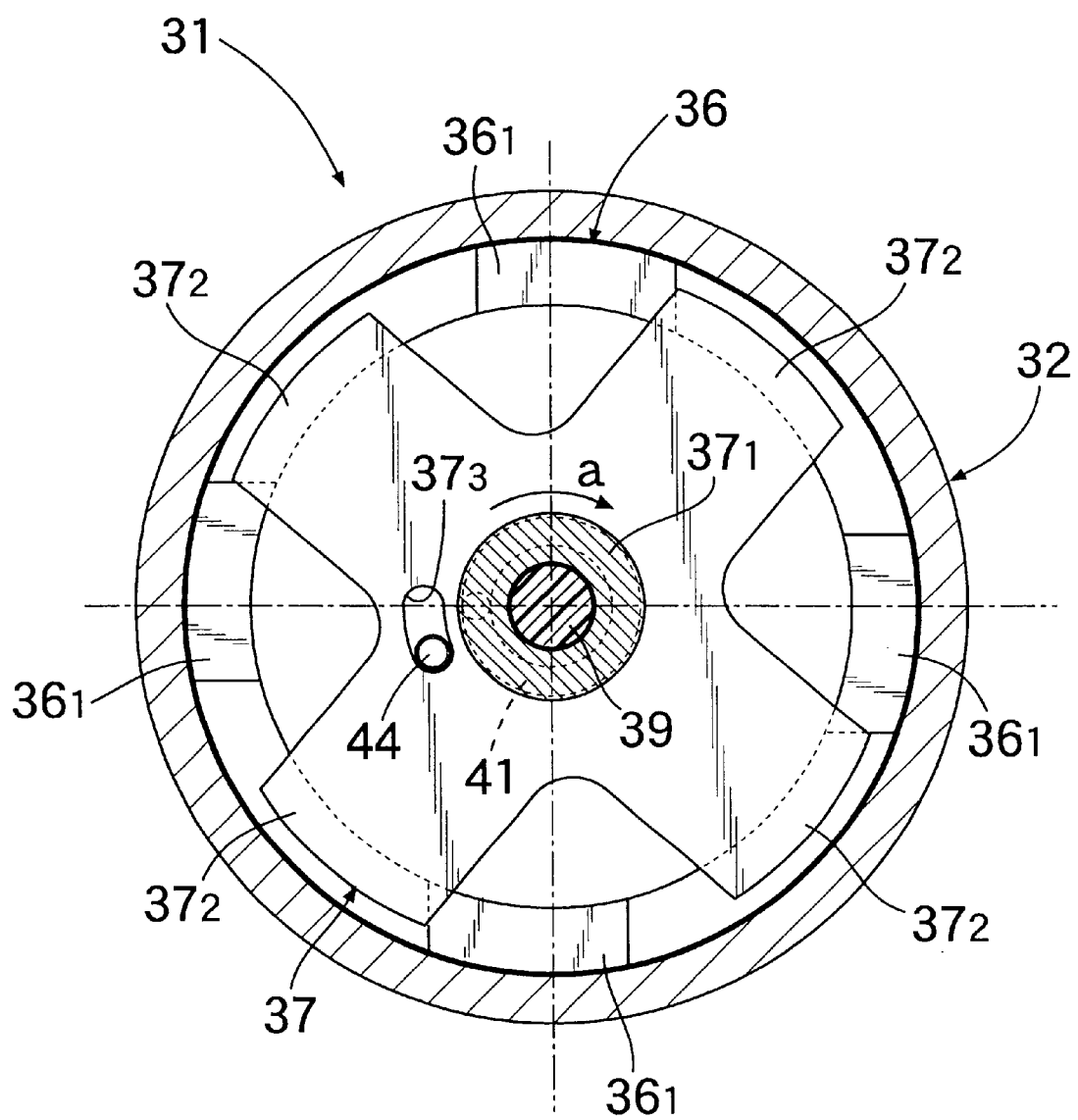

One end of the driving rotary shaft 39 is in abutment against a thrust bearing $36_2$ projectingly provided at the central portion of the core 36, and is biased in a direction of an arrow a in FIG. 7 by a torsion spring 41 mounted between such one end and the housing 32. A coil 43 wound around a coil bobbin 42 is disposed within the core 36 to surround the peripheries of the shaft portion $37_1$ of the rotor 37 and the driving rotary shaft 39. A stop pin 44 which is made of, for example, a resin and which is embedded in an end surf ace of the core 36, is fitted in an arcuate elongated bore $37_3$ defined in the rotor 37, so that the range of rotation of the rotor 37 is limited by the abutment of the stop pin 44 against opposite ends of the elongated bore $37_3$.

A follower rotary shaft 46 is rotatably carried on an end wall $32_2$ of the housing 32 with a ball bearing 45 interposed therebetween, and has a flange $46_1$ formed at one end thereof to abut against an inner race of the ball bearing 45. This simple structure ensures that the follower rotary shaft 46 can be prevented from being withdrawn from the housing 32. In addition, since the driving rotary shaft 39 and the follower rotary shaft 46 are carried in the housing 32 with the ball bearings 38 and 45 interposed therebetween, respectively, the resistance to the rotation of the driving rotary shaft 39 and the follower rotary shaft 46 can be suppressed to the minimum.

The first operating member 34 includes a boss portion $34_2$ fitted over the driving rotary shaft 39, and an arm portion $34_3$ extending radially from the boss portion $34_2$ and having the locking surface $34_1$ formed at its tip end. The boss portion $34_2$ has a gear $34_4$ formed on one half of its outer periphery, and an arcuate surface $34_5$ formed around its inner periphery for line contact with the outer peripheral surface of the driving rotary shaft 39. The first operating member 34 having the arcuate surface $34_5$ in line contact with the outer peripheral surface of the driving rotary shaft 39 is capable of being oscillated in any direction relative to the driving rotary shaft 39.

A resiliently deformable first clip 47 for fixing the first operating member 34 to the driving rotary shaft 39 includes a ring-shaped body portion $47_1$ abutting against an upper surface of the boss portion $34_2$ of the first operating member 34, a pair of rotary shaft coupling arms $47_2$, $47_2$ extending radially inwards from the body portion $47_1$, and a pair of operating member coupling arms $47_3$, $47_3$ extending radially outwards from the body portion $47_1$. Each of the rotary shaft coupling arms $47_2$ is engaged into locked bore $39_2$ defined at a tip end of the driving rotary shaft 39, and a locking claw $47_4$ projectingly provided in a radially inward turned manner at a tip end of the driving rotary shaft 39 is engaged into a locking bore $34_6$ defined in the boss portion $34_2$ of the first operating member 34. Therefore, the rotation of the first driving shaft 39 is transmitted through the rotary shaft coupling arms $47_2$, $47_2$ and the operating member coupling arms $47_3$, $47_3$ to the first operating member 34.

Likewise, the second operating member 35 is fixed to the follower rotary shaft 46 through a second clip 48. The structure of the second operating member 35 having the locking surface $35_1$, a boss portion $35_2$, an arm portion $35_3$, the gear $35_4$, an arcuate surface $35_5$ and a locked bore $35_6$ is substantially identical with that of the first operating member 34 which has been described above. The structure of the second clip 48 having a body portion $48_1$, rotary shaft coupling arms $48_2$, $48_2$, operating member coupling arms $48_3$, $48_3$ and locking claws $48_4$, $48_4$ is substantially identical with that of the first clip 47 which has been described above. Therefore, the duplicated description of these structures is omitted.

The gear $34_4$ of the first operating member 34 is meshed with the gear $35_4$ of the second operating member 35 to transmit a driving force. These gears $34_4$ and $35_4$ constitute an operatively connecting means of the present invention.

The operation of the embodiment of the present invention having the above-described arrangement will be described below.

When the driver does not depress the brake pedal, the coil 43 of the rotary solenoid 31 of the rotary electromagnetic actuator A is in its non-exited state, and the driving rotary shaft 39 is in a state in which it has been rotated in the direction of the arrow a in FIG. 7 by a resilient force of the torsion spring 41, whereby the stop pin 44 has been brought into abutment against one end of the elongated bore $37_3$ of the rotor 37 and is in a stopped state. At this time, the first and second operating members 34 and 35 are in positions shown in FIG. 10A, and the locking faces $34_1$ and $35_1$ of the first and second operating members 34 and 35 face the right sides of the "N" and "P" ranges, respectively. Therefore, even if the driver attempts to operate the select lever 15 from the "N" range to the "R" range, or from the "P" range to the "R" range, the locked member $16_3$ of the lever base 16 is locked non-movably by the locking surfaces $34_1$ and $35_1$ of the first and second operating members 34 and 35 to prohibit such operation of the select lever 15.

Figure 8:
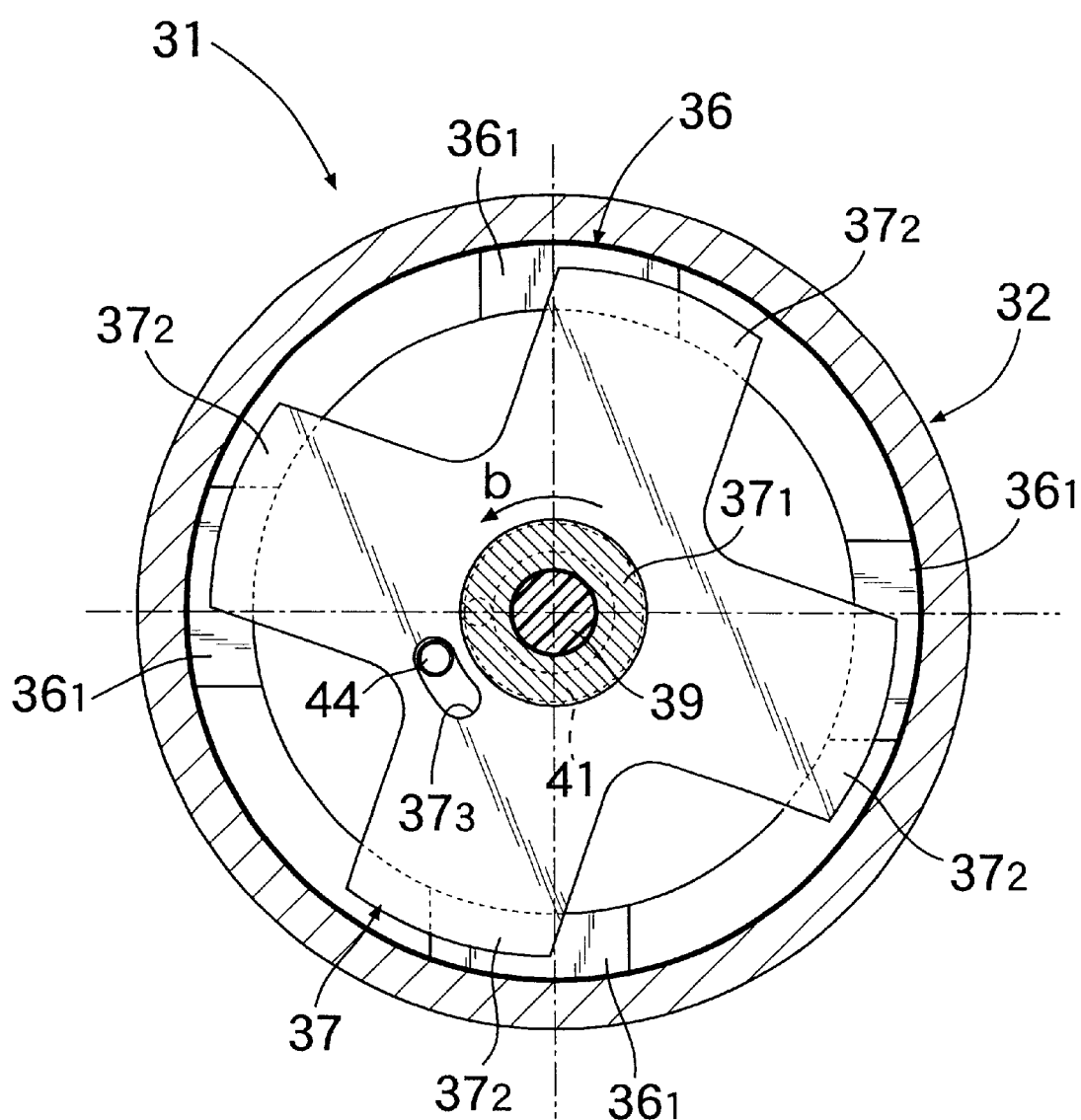
Figure 9:
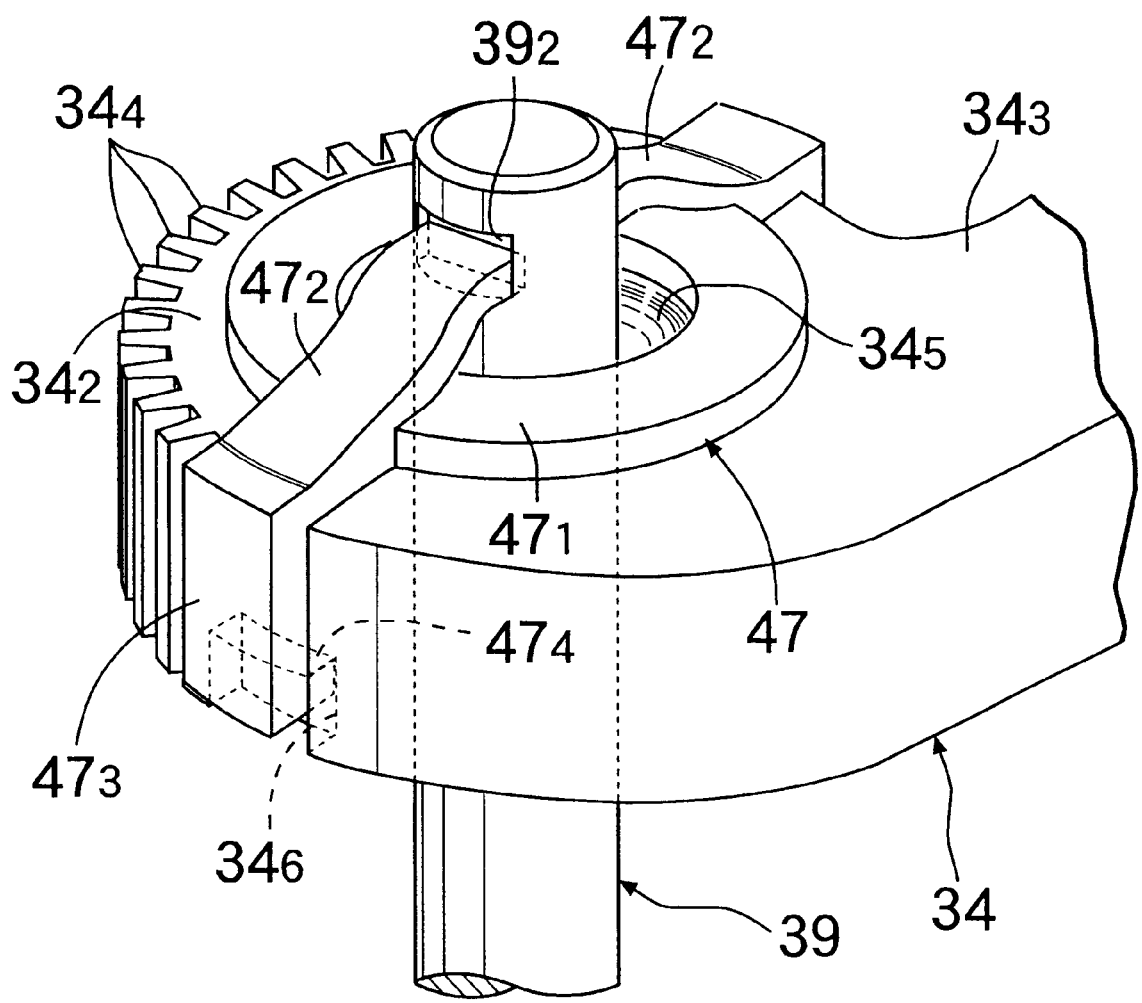

When the driver depresses the brake pedal from this state, the coil 43 of the rotary solenoid 31 of the rotary electromagnetic actuator A is excited, and the rotor 37 having the four arm portions $37_2$ attracted to the four protrusions $36_1$ of the magnetized core 36 is rotated in a direction of an arrow b in FIG. 8 against the resilient force of the torsion spring 41, and then the stop pin 44 is stopped in a position in which it abuts against the other end of the elongated bore $37_3$ in the rotor 37. At this time, a thrust force is applied to the rotor 37 attracted to the core 36, but is supported by the abutment of one end of the driving rotary shaft 39 against the thrust bearing $36_2$ of the core 36.

Figure 10A:
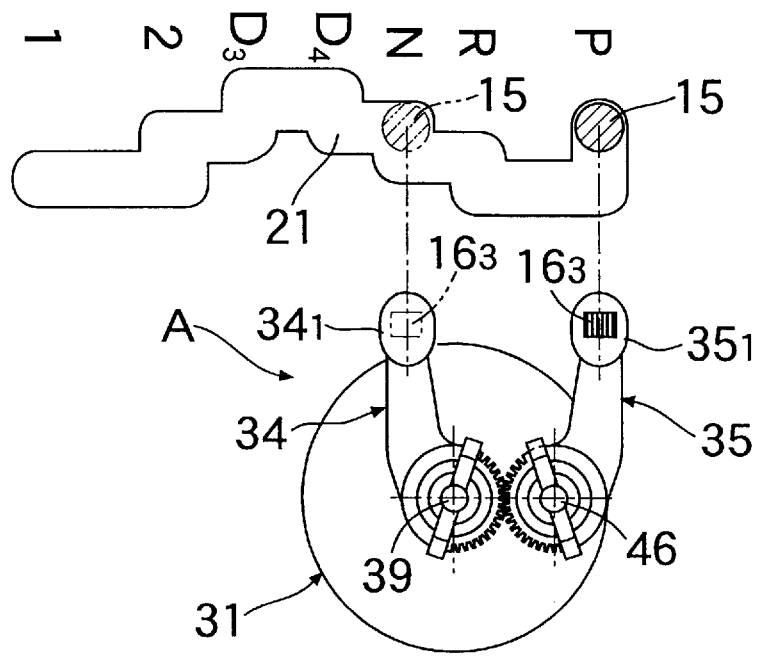
Figure 10B:
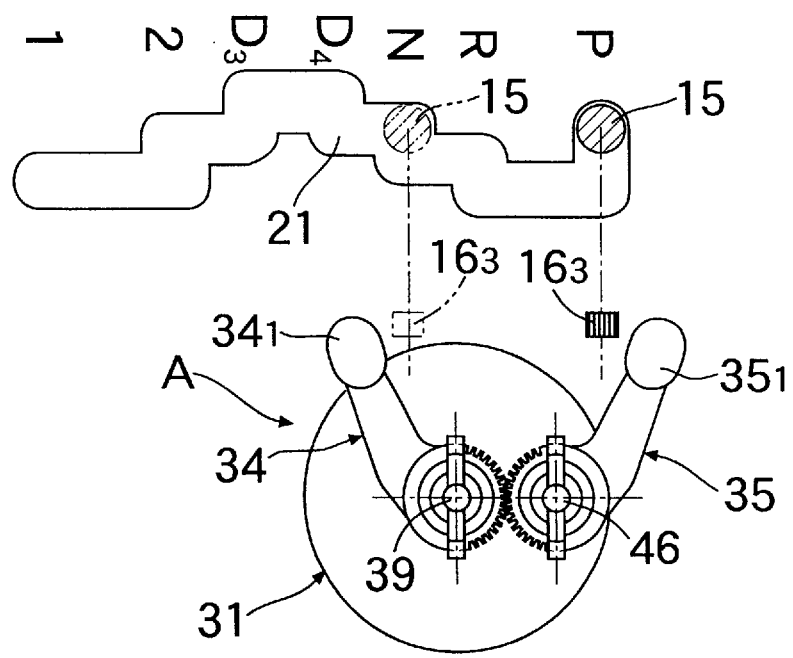
Figure 11A:
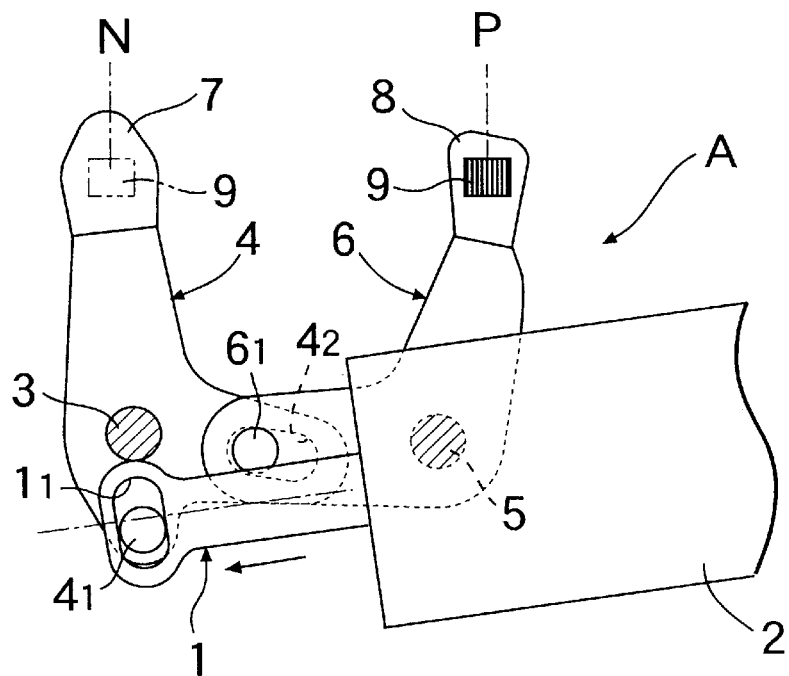
FIGS. 11A and 11B are views for explaining the operation of a prior art rotary electromagnetic actuator.
Figure 11B:
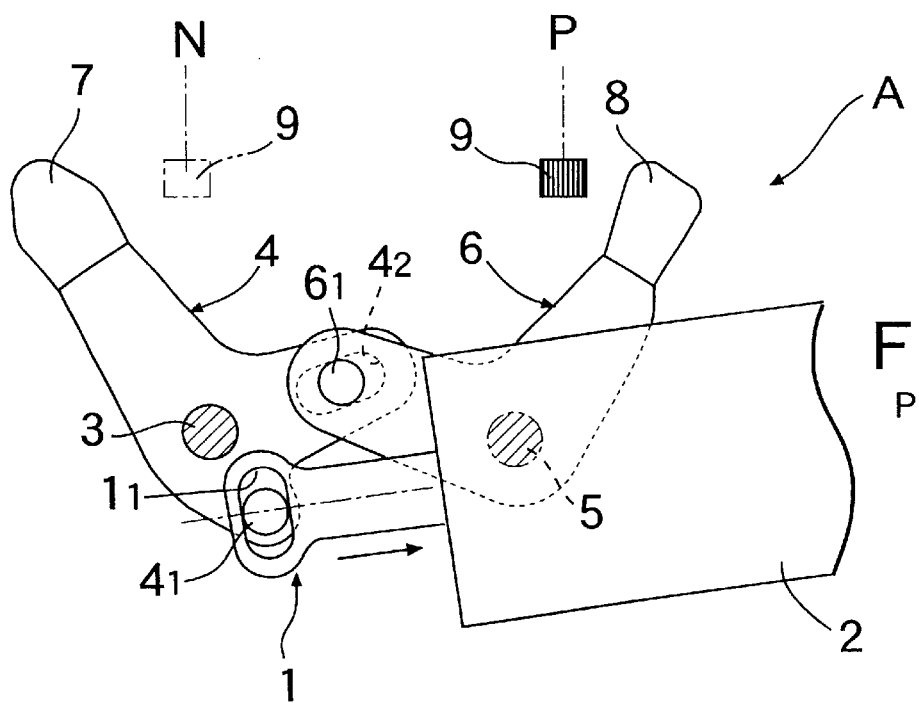

When the first operating member 34 is rotated in a counterclockwise direction from a position shown in FIG. 10A to a position shown in FIG. 10B in the above manner, the second operating member 35 is rotated in a clockwise direction in association with the rotation of the first operating member 34, because the gear $34_4$ formed on the outer periphery of the boss portion $34_2$ of the first operating member 34 is meshed with the gear $35_4$ formed on the outer periphery of the boss portion $35_2$ of the second operating member 35. Thus, the first and second operating members 34 and 35 are retracted from the right side of the locked member $16_3$ of the lever base 16 of the select lever 15 located in the "N" or "P" range, thereby permitting the operation of the select lever 15 from the "N" range to the "R" range or from the "P" range to the "R" range.

In a path f or transmitting the driving force of the rotary solenoid 31 to the first and second operating members 34 and 35, there are no pin and no elongated bore, or no slide area where a looseness and a friction are liable to be produced, such as between a stationary shaft and a link, i.e., no means for converting a rectilinear motion to a rotational motion, and the transmission of the driving force is conducted using only the gears $34_4$ and $35_4$. Therefore, not only the number of parts and the number of assembling steps are reduced, but also the assembling accuracy is enhanced, thereby enabling a noiseless smooth operation. In particular, since the first and second operating members 34 and 35 are carried on the rotary shafts rather than on stationary shafts used in the prior art, a resistance to the siding movement cannot be produced between the first operating member 34 and the driving rotary shaft 39 as well as between the second operating member 35 and the follower rotary shaft 46, because they are rotated in unison with each other. Additionally, the driving rotary shaft 39 itself which is an output shaft of the rotary solenoid 31 also serves to support the first operating member 34 and hence, the number of parts and the number of assembling steps are further reduced. Moreover, the driving rotary shaft 39, the follower rotary shaft 46 and the first and second operating members 34 and 35 can be integrally assembled to the housing 32 of the rotary solenoid 31 to previously form an assemble and hence, the assemblability to and the handleability of the rotary electromagnetic actuator A are enhanced remarkably.

In addition, it is unnecessary to apply a lubricant such as a silicone grease to the gears $34_4$ and $35_4$, unlike a pin and an elongated bore, or slide area such as between a stationary shaft and a link, and hence, an increase or decrease in sliding resistance due to a variation in temperature is not produced. Therefore, it is unnecessary to increase the size of the rotary solenoid 31 in order to overcome a large sliding resistance at a low temperature. This ensures that not only a reduction in size of the rotary electromagnetic actuator A is possible, but also when the sliding resistance is decreased with an increase in temperature, the driving force of the rotary solenoid 31 cannot be excessive, and the stop pin 44 is prevented from colliding against the end of the elongated bore $37_3$ to generate a noise. Further, the characteristic of the driving force of the rotary solenoid 31 is less varied depending upon the rotational angle of the rotary shaft 39, as compared with advancing and retracting type solenoid or the like. Therefore, the driving force is prevented from being increased at the end of the stroke of the rotary solenoid 31, and a noise due to the collision of the stop pin 44 against the end of the elongated bore $37_3$ is prevented further effectively.

When a large load is applied to the first operating member 34, the rotary shaft coupling arms $47_2$, $47_2$ and the operating member coupling arms $47_3$, $47_3$ of the first clip 47 for fixing the first operating member 34 to the driving rotary shaft 39 are resiliently deformed to permit the relative movement between the driving rotary shaft 39 and the first operating member 34, thereby buffering a shock. Likewise, when a large load is applied to the follower rotary shaft 46, the rotary shaft coupling arms $48_2$, $48_2$ and the operating member coupling arms $48_3$, $48_3$ of the second clip 48 for fixing the second operating member 35 to the follower rotary shaft 46 are resiliently deformed to permit the relative movement between the follower rotary shaft 46 and the second operating member 35, thereby buffering a shock. Further, the first and second operating members 34 and 35 are oscillatably carried on the driving rotary shaft 39 and the follower rotary shaft 46 through the arcuate surfaces $34_5$ and $35_5$, respectively. Therefore, when an eccentric load is applied to the first and second operating members 34 and 35, it is possible to prevent the generation of non-smooth sliding or galling between the first and second operating members 34 and 35, between the driving rotary shaft 39 and the first operating member 34 or between the follower rotary shaft 46 and the second operating member 35 to permit a smooth operation.

Although the embodiment of the present invention has been described in detail, it will be understood that the present invention is not limited to the above-described embodiment, and various modifications may be made without departing from the spirit and scope of the invention defined in claims.

For example, the rotary electromagnetic actuator A described in any of claims 1 to 9 is applicable to an application other than a shift lock device of an automatic transmission.

The rotary solenoid 31 has been used as the rotary electromagnetic actuator A in the present embodiment, but a torque motor, another means such as a step motor or the like may be used.

In place of connecting the driving rotary shaft 39 and the first operating member 34 to each other by the first clip 47, the driving rotary shaft 39 and the first operating member 34 may be integrated or formed integrally with each other without use of the first clip 47. This applies for the follower rotary shaft 46 and the second operating member 35.

What is claimed is:

1. A rotary electromagnetic actuator, comprising: an electromagnetic driving source including a driving rotary shaft rotatably carried in a housing and driven in rotation by an electromagnetic force, a follower rotary shaft rotatably carried in said housing, a first operating member carried on and rotated in unison with said driving rotary shaft, a second operating member carried on and rotated in unison with said follower rotary shaft, and an operatively connecting means for permitting said first operating member and said second operating member to be rotated in association with each other.

2. A rotary electromagnetic actuator, comprising: an electromagnetic driving source including a driving rotary shaft rotatably carried in a housing and driven in rotation by an electromagnetic force, a follower rotary shaft rotatably carried in said housing, a first operating member carried on and rotated in unison with said driving rotary shaft, a second operating member carried on and rotated in unison with said follower rotary shaft, and an operatively connecting means for permitting said first operating member and said second operating member to be rotated in association with each other, wherein said first and second operating members are provided at their free ends respectively with locking surfaces capable of inhibiting the movement of a locked member, said locking surfaces are arranged so as to face a path of movement of the locked member in a non-excited state of said electromagnetic driving source to inhibit the movement of said locked member, and to be retracted from the path of movement of the locked member upon excitation of said electromagnetic drive source to permit the movement of the locked member.

3. A rotary electromagnetic actuator according to claim 2, wherein said operatively connecting means is gears which are formed on outer peripheral surfaces of said first and second operating members and meshed with each other.

4. A rotary electromagnetic actuator according to claim 3, wherein said first operating member is coupled to said driving rotary shaft through a first resiliently deformable clip, and said second operating member is coupled to said follower rotary shaft through a second resiliently deformable clip.

5. A rotary electromagnetic actuator according to claim 4, wherein said first operating member is oscillatably carried on said driving rotary shaft, and said second operating member is oscillatably carried on said follower rotary shaft.

6. A rotary electromagnetic actuator, comprising: an electromagnetic driving source including a driving rotary shaft rotatably carried in a housing and driven in rotation by an electromagnetic force, a follower rotary shaft rotatably carried in said housing, a first operating member carried on and rotated in unison with said driving rotary shaft, a second operating member carried on and rotated in unison with said follower rotary shaft, and an operatively connecting means for permitting said first operating member and said second operating member to be rotated in association with each other, wherein said driving rotary shaft and said follower rotary shaft are rotatably carried in said housing of said electromagnetic driving source through bearing means.

7. A rotary electromagnetic actuator according to claim 6, wherein said follower rotary shaft is prevented from being withdrawn by the abutment of a flange provided on said follower rotary shaft against said bearing means.

8. A rotary electromagnetic actuator, comprising: a rotary solenoid including a rotor having a driving rotary shaft rotatably carried in a housing with four arm portions extending radially from the driving rotary shaft and driven in rotation by an electromagnetic force, a follower rotary shaft rotatably carried in said housing, a first operating member carried on and rotated in unison with said driving rotary shaft, a second operating member carried on and rotated in unison with said follower rotary shaft, and an operatively connecting means for permitting said first operating member and said second operating member to be rotated in association with each other.

9. A rotary electromagnetic actuator, comprising: an electromagnetic driving source including a driving rotary shaft rotatably carried in a housing and driven in rotation by an electromagnetic force, a follower rotary shaft rotatably carried in said housing, a first operating member carried on and rotated in unison with said driving rotary shaft, a second operating member carried on and rotated in unison with said follower rotary shaft, and an operatively connecting means for permitting said first operating member and said second operating member to be rotated in association with each other, said first and second operating member being provided at their free ends respectively with locking surfaces capable of inhibiting the movement of a select lever for an automatic transmission, said locking surfaces of said first and second operating members being arranged so as to face a path of movement of the select lever in a non-excited state of said electromagnetic driving source to inhibit the movement of the select lever from a parking range and a neutral range, and to be retracted from the path of movement of the select lever upon excitation of said electromagnetic driving source to permit the movement of the select lever from the parking range and the neutral range.

* * * * *